US008852488B2

(12) United States Patent
Sain et al.

(10) Patent No.: US 8,852,488 B2
(45) Date of Patent: Oct. 7, 2014

(54) MANUFACTURING PROCESS FOR HIGH PERFORMANCE SHORT LIGNO-CELLULOSIC FIBRE—THERMOPLASTIC COMPOSITE MATERIALS

(76) Inventors: Mohini M. Sain, Toronto (CA); Suhara Panthapulakkal, Burlington (CA); Shiang F. Law, Toronto (CA)

( * ) Notice: Subject to any disclaimer, the term of this patent is extended or adjusted under 35 U.S.C. 154(b) by 1938 days.

(21) Appl. No.: 11/005,520

(22) Filed: Dec. 6, 2004

(65) Prior Publication Data
US 2005/0225009 A1    Oct. 13, 2005

Related U.S. Application Data

(60) Provisional application No. 60/560,987, filed on Apr. 12, 2004.

(51) Int. Cl.
*B29C 45/00* (2006.01)

(52) U.S. Cl.
CPC ....... *B29C 45/0005* (2013.01); *B29C 458/0013* (2013.01)
USPC .................................................. 264/328.18

(58) Field of Classification Search
USPC ..................................... 264/135, 180, 328.18
See application file for complete search history.

(56) References Cited

U.S. PATENT DOCUMENTS

| | | | | | |
|---|---|---|---|---|---|
| 3,645,939 | A | * | 2/1972 | Gaylord | 24/13 X |
| 3,943,079 | A | * | 3/1976 | Hamed | 524/14 |
| 4,616,989 | A | * | 10/1986 | Mewes et al. | 264/349 X |
| 6,207,729 | B1 | * | 3/2001 | Medoff et al. | 523/129 |
| 2002/0000683 | A1 | * | 1/2002 | Sears et al. | 264/328.18 X |

* cited by examiner

*Primary Examiner* — Leo B Tentoni
(74) *Attorney, Agent, or Firm* — Hill & Schumacher

(57) ABSTRACT

The present invention relates to a process for the manufacture of short or discontinuous lignocellulosic fiber in combination with synthetic fiber filled thermoplastic composites, in which the process consists of preferably, defiberization and dispersion of the cellulosic fibers in the thermoplastic matrix, further consolidation and dispersion of the blended thermoplastic composition, further blending of the same with inorganic fibers to get the moldable thermoplastic composition and further injection or compression or compression injection molded under high pressure ranging from 100 tones to 1000 tones and a temperature range from 170 to 210 degree centigrade into composite products. The said composites have a tensile strength of at least 75 MPa and a flexural strength of at least 125 MPa. The invention also relates to the use of the said composites in automotive, aerospace, furniture and other structural applications.

11 Claims, No Drawings

MANUFACTURING PROCESS FOR HIGH PERFORMANCE SHORT LIGNO-CELLULOSIC FIBRE—THERMOPLASTIC COMPOSITE MATERIALS

REFERENCES CITED

US PATENT DOCUMENTS

| | | | |
|---|---|---|---|
| 6,610,232 | Aug. 26, 2003 | Jacobsen; William W. | 264/177.2 |
| 6,270,883 | Aug. 7, 2001 | Sears; Karl D., Jacobson; Rodney E., Caulfield; Daniel F., Underwood; John | 428/292.1 |
| 5,288,772 | Feb. 22, 1994 | Hon; David N.-S. | 524/35 |
| 5,120,776 | Jun. 9, 1992 | Raj; Govinda, Kokta; Bohuslav V. | 524/13 |
| 4,559,376 | Dec. 17, 1985 | Kubat; Josef, Klason; Tore C. F. | 524/13 |
| 4,717,742 | Jan. 5, 1988 | Beshay; Alphons D. | 523/203 |
| 4,442,243 | Apr. 10, 1984 | Woodhams; Raymond T. | 523/212 |

OTHER REFERENCES

CA 2235531: Apr. 25, 1997. Groeneveld; Hendrik Adrian Cornelis., Zomers; Franciscus Hillebrand Adriaan., Pott; Gerard Tjarko., Appl. No. 97201249-6

EP 1121244: Aug. 8, 2001 Sears Karl D., Jacobson Rodney E. IPC: B32B5/16

Rana A. K.; Mandal, A. and Bandyopadhyay, S.; Composite Science and Technology, 63, 2003, 801-806.

Rana A. K.; Mandal, A.; Mitra, B. C.; Jacobson, R.; Rowell, R. and Banerjee, A. N.; Journal of Applied Polymer Science, 69, 1998, 329-338.

BACKGROUND OF THE INVENTION

This invention relates to a process for the manufacture of a moldable cellulosic fibre-inorganic fibre filled polymer composition and where after injection or compression or compression injection molded into composite product of the same composition with improved properties, preferably tensile strength not less than 75 MPa and flexural strength not less than 125 MPa. The said process consisting of two stages: melt blending of the cellulosic fibre with polymer in the presence of surface active agents under high temperature and shear which results in dispersion of the cellulosic fibres in the polymer, further consolidation and blending with inorganic fibres to moldable thermoplastic composition. The present invention also relates to said polymer composite product manufactured by the said process and to the use of the product within structural applications of automotive, aerospace, furniture and other industries.

Addition of fillers and reinforcement materials to plastics is the typical method used to improve the performance properties, such as tensile strength, modulus values and impact resistance etc. The most widely used reinforcement materials for both thermoplastics and thermosets include inorganic fillers such as glass, talc, and calcium carbonate. Although they impart high strength, dimensional stability and heat resistance to the plastic composite, these fillers are costly, abrade process equipment, and increase the density of the products. As an alternative to these fillers, natural fibres or lignocellulosic fibres have been evaluated as reinforcements for plastics and there is an increasing worldwide interest in the development of natural fibre reinforced thermoplastic/thermoset composite. The interest is driven by the advantages of these natural fibres in contrast to inorganic fillers and includes:

- plant fibres have relatively low densities compared to inorganic fillers
- plant fibres result in reduced wear on the processing equipment
- plant fibres have the advantages of health and environmental issues
- plant fibres are renewable resources and their availability is more or less unlimited
- composites reinforced by plant fibres are $CO_2$ neutral
- plant fibres composites are recyclable and are easy to dispose
- complete biodegradable composite product can be made from plant fibres if used in combination with biopolymers.

However, poor dispersion of fibres in the plastic matrix, lack of interfacial interaction between the fibres and the plastic matrix are still pertaining as the challenges in the development of plant fibre reinforced composite product with improved properties. Poor dispersion, being resulted from the strong hydrogen bonds between the cellulosic fibres and lack of compatibility arises from the very different nature of the hydrophilic surfaces of plant fibres and the hydrophobic nature of the polymeric surfaces. It would be necessary to develop a process for manufacturing high performance composite product with discontinuous cellulosic fibres by properly dispersing the fibres in the plastic matrix. Extensive research work has been done in this topic and several methods have been developed to improve the compatibility between the plant fibres and plastics and also to improve wettability of the fibres with that of the plastic matrix to enhance fibre dispersion.

Use of functionalised polymers and grafting of cellulosic fibres with silane for improving dispersion and adhesion between fibre and matrix have been disclosed by Woodhams in U.S. Pat. No. 4,442,243 (1984) and Besahay in U.S. Pat. No. 4,717,7421 (1988) respectively. Raj et. al in U.S. Pat. No. 5,120,776 (1992) teaches a process for chemical treatment of discontinuous cellulosic fibres with maleic anhydride to improve bonding and dispersability of the fibres in the polymer matrix.

Horn disclosed, in U.S. Pat. No. 5,288,772 (1994), the use of pre-treated high moisture cellulosic materials for making composites. Kubat et. al disclosed, in U.S. Pat. No. 4,559,376 (1985), a pre-hydrolytic treatment or a chemically degrading treatment of the fibre prior to compounding of the cellulosic fibre to improve the dispersion of the said fibres in the thermoplastic matrix. A hydrolytic treatment of the fibres at a temperature of 160-200 degree centigrade using water as the softening agent has been claimed by Pott et. al in a Canadian patent, Patent No. CA 2235531 (1997). Sears et. al disclosed a reinforced composite material with improved properties containing cellulosic pulp fibres dispersed in a high melting thermoplastic matrix, preferably nylon [U.S. Pat. No. 6,270,883 (2001) and EP No. 1121244 (2001)]. Rana et. al, in two journal articles (Composite Science and Technology, 63, 2003, 801-806 and Journal of Applied Polymer Science, 69, 1998, 329-338) published a single stage processing of jute fibre reinforced thermoplastic composites by different combinations of compatibilizers and impact modifiers.

Performance of a discontinuous fibre filled composite is also depends on fibre length. For example, longer discontinuous fibres have the capacity to withstand greater stress and hence have greater tensile properties than shorter fibres of similar nature, as longer fibres can absorb more stress prior to failure than a shorter fibre. Jacobsen disclosed in the U.S. Pat. No. 6,610,232 (2003) the use of long discontinuous lignocellulosic fibres for thermoplastic composites.

Medoff and Lagace in the U.S. Pat. No. 6,207,719 (2001) disclosed manufacturing of texturised cellulosic and lignocellulosic materials. Further they give example to use texturised fibres for making composite using conventional equipment such as a roll mill.

Although prior art show processing of thermoplastic composites containing lignocellulosic fillers with different combinations of thermoplastics, cellulosic fillers including texturised cellulose fillers and coupling agents, and fibre treatments, the particular feature of the present invention are absent in the prior art. The prior art is deficient in producing high strength performance cellulosic filled thermoplastic composite materials, which is overcome by the present invention that leads to development of high strength composite materials from inexpensive thermoplastics and lignocellulosic fibres.

BRIEF SUMMARY OF THE INVENTION

The present invention is a process for manufacturing improved moldable thermoplastic composition, where short or discontinuous plant fibres are properly dispersed and blended with inorganic glass fibres, subsequently injection or compression or compression injection molded into composite product with improved properties, preferably with a tensile strength not less than 75 MPa and flexural strength not less than 120 MPa. More specifically, it is an object of the present invention to develop a process for the manufacture of a moldable cellulosic fibre filled thermoplastic composition and their conversion into injection or compression or compression injection molded composite product with improved properties, where in the said composite product comprising a thermoplastic matrix material reinforced by short or long discontinuous plant fibres in combination with inorganic fibres, and preferably by the use of surface active agents.

Preferably thermoplastic material is a polyolefin, more preferably polypropylene, but other thermoplastic materials are useful as well, eg: polyethylene, polystyrene and polyethylene-polypropylene copolymers, polylactides, polyhydroxybutyrates, and polyethyleneterephthalate. The thermoplastics can also be selected from a number of post consumer or post-industrial waste sources.

Surface-active agents used in the said composite are preferably higher or lower molecular weight maleated polypropylene, henceforth also designated as MAPP, or the blends of the same in combination with silane functional polymers with PP as the matrix material. Other preferable compatibilizers are selected from functional silanes along with the group consisting of a maleated polyethylene, maleated polystyrene in combination with PE and PS respectively.

The lignocellulosic/cellulosic reinforcement in the composite product manufactured by the process of invention consists of either wood pulp fibres, preferably, thermomechanical pulp (TMP), chemical pulp such as kraft pulp or bleached kraft pulp (BKP) and plant bast fibres, preferably hemp and flax. Other preferable fibres include
  pulp from any virgin or waste soft wood and hard wood, non-wood fibres from bast, leaf, seed and fruit such as kenaf, sisal, jute, coir and agricultural residues such as bagasse, corn stalk, wheat, and rice straw.
  Blends of aforementioned natural fibres
  Blends of aforementioned natural fibres with synthetic fibres.

Synthetic fibres preferably may be any combination of artificial or chemical fibres including examples such as glass, aramid and carbon. More preferably synthetic fibres used in the present invention include glass fibres.

The said object of the present invention is the manufacturing process comprising the following steps:
  defiberization and melt blending of the discontinuous cellulosic fibres with thermoplastic material and surface active agents at high temperature and shear using a high shear thermo kinetic mixer with an r.p.m of not less than 3200.
  Further consolidation of the composition in a low shear mixer at an r.p.m. of not less than 60 and at a temperature range between 185-210° C. and where after blending glass fibres with the said consolidated composition using the same equipment.
  Injection or compression or compression injection molding of the moldable cellulosic fibre filled thermoplastic composition under high pressure ranging from 100 tones-1000 tones and under a temperature range of 170-200 degree centigrade in to a composite product of tensile strength not less than 75 MPa and flexural strength not less than 125 MPa.

The present invention offers advantages over the prior art related, including
  Improved dispersion of cellulosic fibres in the thermoplastic matrix
  Improved processing flexibility
  Better performance of the composite through better interfacial interaction of the lignocellulosic fibres and inorganic fillers with the thermoplastics by the selected surface active agents.

As mentioned earlier, the process and the composite product developed by the process as per the present invention will find many structural applications, preferably in automotive, aerospace and furniture industry. In addition to the environmental and economical advantages of such composite products, the said composite products can meet the stringent requirements of the said industries including cost, weight reduction, fuel efficiency, disposal and recycling, which are another attraction of the said composite products to the said industries.

The key advantage of the process technology developed in the present invention in comparison to the known techniques is the ability to maximize the performance properties. The technology is practiced in the laboratory scale as well as scale up to the industry level. Yet, another advantage of the composite product they can compete with the existing glass fibre filled composite and use of plant fibres reduce the amount of plastics and synthetic fibres used in the composite and thereof the subsequent energy savings.

DETAILED DESCRIPTION OF THE INVENTION

As mentioned earlier, the key aspect of the invention relates to develop a process to manufacture high performing moldable cellulosic fibre filled thermoplastic compositions and composite products consisting of cellulosic fibres dispersed in a matrix, where in the polymeric matrix comprise a thermoplastic material, cellulosic fibres comprise wood pulp fibres or bast fibres and synthetic fibres comprise glass fibres. Preferably the composites comprise of not less than 60% by weight cellulosic fibres and less than 30% by weight glass fibres, more preferably not less than 40% by weight cellulosic fibres and 15% by weight glass fibres. Preferably, surface active agents (compatibilizers) are used to improve the interaction between the cellulosic and inorganic fibres with the matrix and to substantially disperse the cellulosic and inorganic fibres throughout the matrix.

According to one embodiment, the cellulosic wood pulp fibres have a moisture content of less than 15% by weight, more preferably by 10% by weight and bast fibres have a moisture content of less than 10% by weight, more preferably by 5% by weight.

Suitable pulp fibres include commercially available thermo-mechanical pulp and bleached kraft pulp from soft wood. Both these pulp fibres have a moisture content of less than 10% by weight. Suitable bast fibres include hemp and flax fibres. Other fibres can be selected from any virgin or waste hardwood or soft wood pulp fibres, bast fibres such as kenaf, and jute, leaf fibres such as siasl, and agricultural residues such as bagasse, wheat straw, rice straw and corn stalk.

Synthetic fibres may comprise any kind of artificial or chemical fibres such as glass, carbon, boron and aramid, more preferably glass fibres. Preferably synthetic fibres present in an amount not greater than 20% by weight, more preferably not greater than 15% by weight.

The matrix material of the composition comprises a polymeric material melting preferably less than 200 degree centigrade. Suitable polymeric materials include polyolefins, preferably polpropylene, polyethylene, copolymers of polypropylene and polyethylene or a combination of these and the most preferred general purpose injection mold or extrusion grade polypropylene. Still further materials include polystyrene, polylactides, polyhydroxybutyrates and polyethyleneterphthalate. Preferably, polypropylene with a density of 0.90 g/cm$^3$ was used in the present invention.

The compatibilizers of the said composition comprise of functionalised polymers, preferably maleic anhydride grafted polyolefins with functional silanes, and more preferably maleated polypropylene or maleated polyethylene or a combination of the same with polypropylene and polyethylene matrix materials. Other useful coupling agents include functional silanes along with maleated polystyrene, maleated polylactide, maleated polyhydroxybutyrate in combination with polystyrene, polylactide and polyhydroxybutyrate matrix materials. Preferably, compatibilizer is present in an amount greater than 3% by weight and less than 7% by weight, more preferably in an amount less 6% by weight. Preferably, compatibilizers of the present invention include different types of maleated polyolefines with difference in the content of molecular weight (high and low molecular weight) and functional groups in combination with silane.

According to another embodiment, discontinuous cellulosic pulp fibres were defiberized for not more than 1 minute and melt blended with thermoplastic material and surface active agents, preferably, a high molecular weight maleated polypropylene in combination with silane functional polymer agents, not more than 3 minutes, in a high shear thermokinetic mixer, where after the blend further consolidated in a low shear mixer for not more than 5 minutes and blended with synthetic fibres at a later stage, not more than 3 minutes.

According to yet another embodiment, discontinuous cellulosic pulp fibres were defiberized for not more than 1 minute and melt blended with thermoplastic material and surface active agents, preferably, a low molecular weight maleated polypropylene in combination with silane functional polymer, not more than 3 minutes, in a high shear thermokinetic mixer, where after the blend further consolidated in a low shear mixer for not more than 5 minutes and blended with synthetic fibres at a later stage, not more than 3 minutes.

According to another preferred embodiment, discontinuous cellulosic pulp fibres were defiberized for not more than 1 minute and melt blended with thermoplastic material and surface active agents, preferably, a combination of low and high molecular weight maleated polypropylene and silane functional polymer, not more than 3 minutes, in a high shear thermokinetic mixer, where after the blend further consolidated in a low shear mixer for not more than 5 minutes and blended with synthetic fibres at a later stage, not more than 3 minutes.

According to a still further embodiment, a combination of discontinuous cellulosic pulp fibres were defiberized for not more than 1 minute and melt blended with thermoplastic material and surface active agents, preferably, a combination of low and high molecular weight maleated polypropylene and silane functional polymers, not more than 3 minutes, in a high shear thermokinetic mixer, where after the blend further consolidated in a low shear mixer for not more than 5 minutes and blended with synthetic fibres at a later stage, not more than 3 minutes.

According to one embodiment, discontinuous bast fibres preferably hemp and flax in combination with synthetic fibres are melt blended with thermoplastic material and surface active agents, preferably, a high molecular weight maleated polypropylene in combination with silane functional polymer, not more than 5 minutes.

According to another embodiment, discontinuous bast fibres, preferably flax are melt blended with thermoplastic material surface active agents, preferably, a high molecular weight maleated polypropylene in combination with silane functional polymer, not more than 5 minutes and blended with synthetic fibres at a later stage and not more than 3 minutes.

Another embodiment relates to the methods of making injection or compression or compression injection molded composite products from the all said thermoplastic compositions comprising discontinuous cellulosic fibre in combination with discontinuous synthetic fibres. Preferably the method comprising injection molding of the pre-dried said composition.

The reinforced composite products as per the present invention have improved performance properties and characteristics, preferably tensile strength and modulus not less than 75 MPa and 4 GPa and flexural strength and modulus not less than 135 MPa and 5 GPa.

According to one embodiment, the composite comprising thermoplastic filled with pulp fibres has a tensile and flexural strength greater than different from the unfilled thermoplastic matrix material and a tensile and flexural modulus greater than that of unfilled thermoplastic matrix material. More preferably, composite has a tensile and flexural strength and moduli greater than that of the thermoplastic matrix material.

According to another preferred embodiment, the composite comprising thermoplastic filled with bast fibres has tensile and flexural strength greater than different from the unfilled thermoplastic matrix material and tensile and flexural moduli greater than that of unfilled thermoplastic matrix material. More preferably, composite has tensile and flexural strength and moduli greater than that of the thermoplastic matrix material.

According to another preferred embodiment, composite products comprising pulp fibres in combination with low molecular weight compatibilizer have better performance properties and characteristics.

According to yet another embodiment, composite products comprising pulp fibres and a combination of low and high molecular weight compatibilizer have more or less same performance properties as that of the said composite where in compatibilizer is a high molecular weight maleated polypropylene.

Another embodiment relates to the difference in performance properties of the composite products where in the synthetic fibres are added at different stages of blending. Composite products where in synthetic fibres blended at a later stage have better performance properties compared to composite products where in synthetic fibres blended at more or less same time as that of cellulosic fibres.

EXAMPLES

The following examples are illustrative of some of the moldable thermoplastic compositions and composite products comprising cellulosic fibres in combination with synthetic fibres and the methods of making the same within the scope of the present invention. Plentiful changes and modifications can be made with respect to the invention by one of ordinary skill in the art.

Example 1

Processing of Moldable Thermoplastic Composition by Two Stage Compounding

Examples of the composition of the moldable thermoplastic composition are given in Table 1. Pulp fibres are defiberized in a high shear internal thermo-kinetic mixer for not more than 1 minute, and blended subsequently with the thermoplastic and maleated polypropylene and half of the silane functional polymer for not more than 3 minutes. The blend thereafter further consolidated using a low shear mixer for not less than five minutes at a temperature of not more than 210 degree centigrade and at an r. p. m. of not less than 60. Synthetic fibres and half of the silane functional polymer were blended with the said composition at a later stage for not more than 3 minutes.

TABLE 1

Composition of the composites

| Sample | Polypropylene | TMP | BKP | Glass | MAPP | Silane |
|---|---|---|---|---|---|---|
| A | 45 (injection mold grade) | 35 | — | 15 | 5 | 0.5 |
| B | 45 (injection mold grade) | 17.5 | 17.5 | 15 | 5 | 0.5 |
| C | 45 (Extrusion grade) | 35 | — | 15 | 5 | 0.5 |

Example 2

Processing of Moldable Thermoplastic Composition Comprising Bast Fibres

Examples of the composition of the moldable thermoplastic composition are given in Table 2. Bast fibres, preferably hemp and flax with an average length of 6 mm were blended with molten polypropylene and maleated polypropylene in a low shear mixer at a temperature not more than 210 degree centigrade and at an r.p.m. not less than 60 for not less than 5 minutes. Glass fibres and silane functional polymer were blended with the said composition at a later stage and preferably not more than 3 minutes.

TABLE 2

Composition of the composites

| Sample | Polypropylene | Hemp | Flax | Glass | MAPP | Silane |
|---|---|---|---|---|---|---|
| D | 45 (injection mold grade) | 35 | — | 15 | 5 | 0.5 |
| E | 45 (injection mold grade) | — | 35 | 15 | 5 | 0.5 |

Example 3

Processing of Moldable Compositions Under Various Processing Conditions

Examples of the composition of the moldable thermoplastic composition are the same as mentioned in Sample A (Table 1).

In one case, pulp fibres were defiberized in a high shear internal thermo-kinetic mixer for not more than 1 minute, and blended subsequently with the thermoplastic and maleated polypropylene and half of the silane functional polymer for not more than 3 minutes. The blend thereafter further consolidated using a low shear mixer for not less than five minutes at a temperature of not more than 210 degree centigrade and at an r. p. m. of not less than 60. Synthetic fibres and half of the silane functional polymer were blended with the said composition at a later stage for not more than 3 minutes.

In the other case, pulp fibres are defiberized in a high shear internal thermo-kinetic mixer for not more than 1 minute, and blended subsequently with the thermoplastic and maleated polypropylene, glass fibres and silane functional polymer for not more than 3 minutes and the blend from the thermokinetic mixer is further consolidated for not less than five minutes at a temperature of not more than 210 degree centigrade and at an r. p. m. of not less than 60.

Sequence of processing for the examples is given below:
Case I:
(1) Defiberize and blend Pulp fibres with polypropylene, MAPP and half of silane functional polymer
(2) Consolidate the blend using a low shear mixer for not more than 3 minutes
(3) Blend with glass fibres and half of the silane functional polymer for further not less than 3 minutes.
Case II
(1) Defiberize and blend Pulp fibres with polypropylene, MAPP, glass fibres and silane functional polymer
(2) Consolidate the blend using a low shear mixer for not more than 5 minutes.

Sample E (Table 2) was also processed under different processing conditions. Processing steps are:
Case 1
Bast fibres, preferably flax, were blended with molten polypropylene and maleated polypropylene in a low shear mixer at a temperature not more than 210 degree centigrade and at an r.p.m. not less than 60 for not less than 5 minutes. Glass fibres and silane functional polymer were blended with the said composition at a later stage and preferably not more than 3 minutes.
Case 2
In contrast to case 1, in a single stage processing, bast fibres were blended with molten polypropylene and maleated polypropylene, glass fibres and silane functional polymer in a low shear mixer with the said conditions as in case I.

Example 4

Processing of Moldable Thermoplastic Compositions with Different Type of Bonding Agents Sample F was prepared with the same procedure as for sample A and sample G was prepared with the same procedure as for sample B, and where in the difference is only the surface active agent used (Table 3).

TABLE 3

Composition of composites

Components (parts by weight)

| | | | | MAPP | | | |
|---|---|---|---|---|---|---|---|
| Sample | PP | TMP | BKP | High molecular weight | Low molecular weight | Glass | Silane |
| A | 45 | 35 | — | 5 | — | 15 | 0.5 |
| F | 45 | 35 | — | — | 5 | 15 | 0.5 |
| B | 45 | 17.5 | 17.5 | 5 | — | 15 | 0.5 |
| G | 45 | 17.5 | 17.5 | 2.5 | 2.5 | 15 | 0.5 |

The said moldable thermoplastic compositions mentioned in different examples were injection molded into test specimens for tensile, flexural and impact tests. Table 4 shows physical properties of the thermoplastic materials, H (injection mold grade PP) and I (extrusion grade PP) used in the present invention.

TABLE 4

Properties of polyolefin

| ASTM Test | Performance property | Sample H | Sample I |
|---|---|---|---|
| ASTM D638 | Tensile Strength, MPa | 31.6 | 31.7 |
| ASTM D638 | Tensile Modulus, GPa | 1.21 | 1.19 |
| ASTM D790 | Flexural Strength, MPa | 50 | 44.7 |
| ASTM D790 | Flexural Modulus, GPa | 1.41 | 1.23 |

Table 5 shows the performance properties of the samples A to E. All these composite samples exhibit a tensile strength of not less than 75 MPa and a flexural strength of not less than 125 MPa. Discontinuous pulp fibre filled composite samples show better strength performance, where as discontinuous bast fibre filled composite samples show better stiffness. All these composite products would be sufficient for applications requiring high strength and stiffness.

TABLE 5

Properties of composites A–E

| ASTM Test | Performance property | Sample A | B | C | D | E |
|---|---|---|---|---|---|---|
| ASTM D638 | Tensile Strength, MPa | 83 | 78 | 81 | 77 | 78 |
| ASTM D638 | Tensile Modulus, GPa | 4.3 | 4.0 | 4.2 | 5.5 | 5.5 |
| ASTM D790 | Flexural Strength, MPa | 135 | 132 | 134 | 127 | 131 |
| ASTM D790 | Flexural Modulus, GPa | 5.9 | 6.1 | 5.8 | 7.0 | 6.9 |
| ASTM D256 | Un-notched Izod Impact Strength, J/m | 293 | 265 | 285 | 287 | 315 |

Performance properties of Samples A and E under different processing conditions are given in the Table 6. Tensile and flexural properties of discontinuous fibre filled thermoplastic composite, where the synthetic fibres were added at a later stage of compounding showed better properties.

TABLE 6

Properties of composites A and E under different processing conditions

| ASTM Test | Performance property | Sample A: Case I | Sample A: Case II | Sample E: Case I | Sample E: Case II |
|---|---|---|---|---|---|
| ASTM D638 | Tensile strength, MPa | 83 | 71 | 78 | 66 |
| ASTM D638 | Tensile Modulus, GPa | 4.3 | 4.6 | 5.5 | 5.9 |
| ASTM D790 | Flexural Strength, MPa | 135 | 113 | 131 | 114 |
| ASTM D790 | Flexural Modulus, GPa | 5.9 | 5.4 | 6.9 | 7.4 |
| ASTM D256 | Un-notched Izod Impact Strength, J/m | 293 | 240 | 315 | 192 |

Mechanical properties of sample A, B, F and G (Table 7) show the effect of coupling agent on the mechanical properties. A low molecular weight maleated polypropylene is quite sufficient to provide better performance properties of the composite products of the present invention.

TABLE 7

Properties of composites A, B, F and G

| ASTM Test | Performance property | Sample A | B | F | G |
|---|---|---|---|---|---|
| ASTM D638 | Tensile strength, MPa | 83 | 78 | 85 | 84 |
| ASTM D638 | Tensile Modulus, GPa | 4.3 | 4.0 | 4.3 | 4.9 |
| ASTM D790 | Flexural Strength, MPa | 135 | 132 | 136 | 139 |
| ASTM D790 | Flexural Modulus, GPa | 5.9 | 6.1 | 6.3 | 6.2 |
| ASTM D256 | Un-notched Izod Impact Strength, J/m | 293 | 265 | 312 | 312 |

The previously described embodiments of the present invention have many advantages; including providing a processing technology for the discontinuous lignocellulosic fibre reinforced thermoplastic compositions and composites, which significantly improve the tensile and flexural properties. The performance properties of the discontinuous pulp fibre filled thermoplastic composites show significant potential of the said fibres for developing high performance composite material. Though discontinuous bast fibres provide a lower strength properties compared to pulp fibres, the said bast fibres provide high stiffness to the said composite. Moreover, performance properties of said composites manufactured by the present process technology invention can be improved further by using numerous combinations of lignocellulosic fibre sources and thermoplastics.

What is claimed is:
1. A process for preparing a moldable short or discontinuous cellulosic fibres filled thermoplastic materials for automotive, aerospace, and furniture applications, wherein the process comprises the steps of:

defiberizing cellulosic fibres in a high shear mixing equipment, followed by melt blending them with a thermoplastic material in the same mixer, in the presence of a surface active agent; and further consolidation of the composition in a low shear mixer, where after blending inorganic fibres with the consolidated composition the mixed compounds containing a combination of inorganic and cellulosic fibres are subjected to heat and pressure by compression and injection without degrading the compound to obtain complex shaped molded articles.

2. A process as recited in claim 1, wherein the thermoplastic material is any one or a combination of a polyolefin selected from the group consisting of polyethylene (PE), polypropylene (PP), Polystyrene (PS), and Polyethylene/polypropylene co-polymers; polylactic acid; polyphenylene terephthalate; and polyhydroxybutyrate.

3. A process as recited in claim 1, wherein the said thermoplastic moldable composition comprises cellulosic fibres is selected from pulp fibres, bast fibres, leaf fibres, and agricultural fibres from corn stalk, wheat and rice straw.

4. A process as in claim 1, wherein the cellulosic fibres comprise of wood pulp fibres and bast fibres.

5. A process as cited in claim 4, wherein wood pulp fibres is selected from thermomechanical pulp (TMP), kraft pulp and bleached kraft pulp (BKP) from hard wood or soft wood or a combination of the same.

6. A process as described in claim 4, wherein the bast fibres are selected from hemp, flax, jute and kenaf, sisal, coir, bagasse, corn stalk, rice and wheat straw and/or a combination of the same.

7. A process as recited in claim 1, wherein the inorganic fibres selected from the group consisting of carbon, aramid, boron, and glass fibres.

8. A process as recited in claim 1, wherein the surface active agents are selected from functional silanes, maleated polyethylene (MAPE), maleated polypropyl ene (MAPP), maleic anhydride grafted polystyrene, polylactide, polyhydroxybutyrate, and polyphenylene terephthalate and a combination of the same.

9. A process as described in claim 1 comprising the manufacture of the cellulosic fibre filled thermoplastic composites by injection molding or compression molding of the said composition under a pressing device ranging from 100 tons to 1000 tons and within a temperature range of 170-210 degree centigrade.

10. A process comprising of manufacturing cellulosic fibre composites from the moldable thermoplastic compositions as in claim 1, containing more than 5% but less than 15% of glass fibre filled composites first compressed under high pressure up to 1000 tons and then injected using a ram to form complex shapes.

11. A process comprising the manufacture of the cellulosic fibre filled thermoplastic composites by compression and injection molding of the said composition as in claim 1 with a temperature less than 210 degree centigrade.

* * * * *